US008266013B2

(12) United States Patent
Kennedy et al.

(10) Patent No.: US 8,266,013 B2
(45) Date of Patent: Sep. 11, 2012

(54) METHODS AND SYSTEMS FOR VENDOR ASSURANCE

(75) Inventors: Christopher Kennedy, Lake Worth, FL (US); Bryan Hurley, Lake Worth, FL (US)

(73) Assignee: Altisource Solutions S.à r.l., Luxembourg (LU)

( * ) Notice: Subject to any disclaimer, the term of this patent is extended or adjusted under 35 U.S.C. 154(b) by 375 days.

(21) Appl. No.: 12/335,196

(22) Filed: Dec. 15, 2008
(Under 37 CFR 1.47)

(65) Prior Publication Data
US 2009/0240596 A1 Sep. 24, 2009

Related U.S. Application Data

(63) Continuation-in-part of application No. 10/937,879, filed on Sep. 10, 2004, now Pat. No. 7,707,055.

(60) Provisional application No. 60/996,975, filed on Dec. 13, 2007, provisional application No. 60/502,273, filed on Sep. 12, 2003.

(51) Int. Cl.
*G06Q 30/00* (2006.01)

(52) U.S. Cl. ........ 705/26.62; 705/26.1; 705/35; 705/38; 705/39

(58) Field of Classification Search ............ 705/26, 705/26.62, 26.1, 35, 38, 39
See application file for complete search history.

(56) References Cited

U.S. PATENT DOCUMENTS

| | | | |
|---|---|---|---|
| 4,799,156 A | 1/1989 | Shavit | |
| 5,592,375 A | 1/1997 | Salmon et al. | |
| 5,758,328 A | 5/1998 | Giovannoli | |
| 5,799,289 A * | 8/1998 | Fukushima et al. | 705/400 |
| 5,940,812 A | 8/1999 | Tengel et al. | |
| 5,995,947 A | 11/1999 | Fraser et al. | |
| 6,513,019 B2 | 1/2003 | Lewis | |
| 6,594,633 B1 | 7/2003 | Broerman | |
| 6,606,606 B2 | 8/2003 | Starr | |
| 6,711,554 B1 | 3/2004 | Salzmann et al. | |
| 6,985,886 B1 | 1/2006 | Broadbent et al. | |
| 7,072,857 B1 | 7/2006 | Calonge | |
| 7,089,503 B1 | 8/2006 | Bloomquist et al. | |
| 7,349,868 B2 * | 3/2008 | Tenorio | 705/26.62 |
| 7,389,242 B2 | 6/2008 | Frost | |
| 7,392,216 B1 | 6/2008 | Palmgren et al. | |
| 7,444,302 B2 | 10/2008 | Hu et al. | |
| 7,451,106 B1 * | 11/2008 | Gindlesperger | 705/37 |

(Continued)

FOREIGN PATENT DOCUMENTS
WO  0115047 A1  3/2001

OTHER PUBLICATIONS

"Ocwen Unveils Enhanced Vendor Management Tool for Mortgage", www.press.arrivenet.com, Mar. 24, 2005, pp. 1-2.

(Continued)

*Primary Examiner* — Jagdish Patel

(57) ABSTRACT

Methods and systems for managing financial transactions. Specifically, the invention includes methods and systems for creating order profiles used to select vendors for carrying out third-party sub-transactions needed to complete financial transactions. A product related to the completion of the financial transaction is selected, a vendor ordering profile is selected, a product vendor that most closely matches the characteristics designated in the ordering profile is selected, and the selected product is ordered from the selected product vendor.

18 Claims, 15 Drawing Sheets

U.S. PATENT DOCUMENTS

| | | | |
|---|---|---|---|
| 7,555,459 | B2 | 6/2009 | Dhar et al. |
| 7,707,055 | B2 * | 4/2010 | Behmoiras et al. .......... 705/7.38 |
| 7,707,071 | B2 | 4/2010 | Rigole |
| 7,707,153 | B1 | 4/2010 | Petito et al. |
| 2002/0023046 | A1 | 2/2002 | Callahan et al. |
| 2002/0040339 | A1 | 4/2002 | Dhar et al. |
| 2002/0052835 | A1 | 5/2002 | Toscano |
| 2002/0138413 | A1 | 9/2002 | Creamer et al. |
| 2002/0188483 | A1 | 12/2002 | Fisher |
| 2003/0004854 | A1 | 1/2003 | Greene et al. |
| 2003/0018558 | A1 | 1/2003 | Heffner et al. |
| 2003/0018575 | A1 | 1/2003 | Beggins et al. |
| 2003/0033587 | A1 | 2/2003 | Ferguson et al. |
| 2003/0101085 | A1 | 5/2003 | Butler, III et al. |
| 2003/0233316 | A1 | 12/2003 | Hu et al. |
| 2004/0019528 | A1 * | 1/2004 | Broussard et al. .............. 705/26 |
| 2004/0083119 | A1 | 4/2004 | Schunder et al. |
| 2004/0083148 | A1 | 4/2004 | Chadrow |
| 2004/0088411 | A1 | 5/2004 | Jakubowski et al. |
| 2004/0111346 | A1 | 6/2004 | MacBeath et al. |
| 2004/0249705 | A1 | 12/2004 | Spencer et al. |
| 2004/0249914 | A1 | 12/2004 | Flocken et al. |
| 2005/0010423 | A1 | 1/2005 | Bagbey et al. |
| 2006/0190394 | A1 | 8/2006 | Fraser et al. |

OTHER PUBLICATIONS

"Vendor Management Subsidiary Strategic Benefits", www.atmprof.com, Mar. 31, 2005, pp. 1-2.

"The Growth of Internalized Vendor Management Subsidiaries", www.atmprof.com, Mar. 31, 2005, pp. 1-2.

"MindBox", ARTEnterprise, 2005, 8 pages.

American Land Title Association, "ALTA Technology New", pp. 2, Jul. 10, 2007, http://www.alta.org/technology/news.cfm?newsID=5187.

Dorado White Paper, "The Dorado Advantage-Networked Origination for the Agile Enterprise", 12 pages, 2006.

Final Office Action, dated Jan. 8, 2010, from corresponding U.S. Appl. No. 11/802,306.

Final Office Action, dated Nov. 30, 2010, from corresponding U.S. Appl. No. 11/802,308.

Final Office Action, dated Oct. 21, 2010, from corresponding U.S. Appl. No. 11/301,247.

Final Office Action, dated Oct. 28, 2009, from corresponding U.S. Appl. No. 11/301,247.

Final Office Action, dated Sep. 16, 2008, from corresponding U.S. Appl. No. 11/301,247.

Metavante Lending Solutions, "Loan Origination Studio: Metavante Lending Solutions", 2007, 10 pages, http://www.ghrsystems.com/ProductsServices/mortgage.sub.--solutionsighrs- ub.--los.html.

Mortgage Cadence Enterprise Lending Solutions, "Mortgage Cadence Orchestrator (Business Components)", 2007, 4 pages, http://www.mortgagecadence.com/productsOrchestrator.asp.

Notice of Allowance, dated May 16, 2011, from corresponding U.S. Appl. No. 11/802,306.

Office Action, dated Aug. 24, 2010, from corresponding U.S. Appl. No. 11/802,306.

Office Action, dated Dec. 1, 2011, from corresponding U.S. Appl. No. 13/232,010.

Office Action, dated Jun. 16, 2009, from corresponding U.S. Appl. No. 11/802,306.

Office Action, dated Mar. 18, 2010, from corresponding U.S. Appl. No. 11/802,308.

Office Action, dated Mar. 24, 2008, from corresponding U.S. Appl. No. 11/301,247.

Office Action, dated Mar. 24, 2009, from corresponding U.S. Appl. No. 11/301,247.

Office Action, dated Mar. 3, 2010, from corresponding U.S. Appl. No. 11/301,247.

Related U.S. Appl. No. 11/802,306, entitled "Method and System for Loan Closing," now U.S. Patent No. 8,024,261 issued Sep. 20, 2011.

Related case—U.S. Appl. No. 11/301,247, filed Dec. 13, 2005, entitled "Product Optimizer," now Publication No. 20060155640.

Related Case—U.S. Appl. No. 11/802,308, entitled "Method and System for Mortgage Exchange," filed May 22, 2007, now abandoned.

Related Case—U.S. Appl. No. 12/723,358, filed Mar. 12, 2010, entitled "Method and System for Vendor Management," now Publication No. 20100268558.

Related Case—U.S. Appl. No. 13/076,044, filed Mar. 30, 2011, entitled "Method and System for Mortgage Exchange."

Related case—U.S. Appl. No. 13/232,010, filed Sep. 14, 2011, entitled "Method and System for Loan Closing."

Scott Kersnar, "Putting All the Pieces Together", SourceMedia Inc. and Mortgage Technology, vol. 13, No. 6, Jul. 2006.

Office Action, dated Apr. 27, 2012, from corresponding U.S. Appl. No. 12/723,358.

Office Action, dated Jul. 17, 2012, from corresponding U.S. Appl. No. 13/232,010.

* cited by examiner

Fig. 6

Vendor Assurance — 600

| WORKSTATION | REPORTS | ADMIN | VENDOR ADMIN | HELPFUL INFO | LOGOFF |

REALTrans.com℠

Options
- Create New File
- Custom Search
- Bulk Management
- Portfolio Management Search Criteria
○ Exact ○ Begins
Enter File # [    ] Go
Enter Borrower Last Name [    ] Go Work Queue [Refresh]  Select View ▼ [Re-Query]

FILES / ORDERS
- Today's Files / Today's Orders
- Last 7 Days / Last 90 Days
- Last 30 Days / Due Today
- Last 90 Days / New Docs — New
- New Msgs / Late
- New Docs / New Forms For other periods, use Custom Search

*Products to Order*
(Click on a product name to see and/or edit the list of available vendors)

| Products | Active Yes / No | Auto Assign Yes / No | Options |
|---|---|---|---|
| ALTERNATIVE VALUATION PRODUCTS | | | |
| ⓘ --Fannie Mac BPO | ⊙ ○ | ○ ⊙ | |
| ⓘ --Freddie Mac BPO | ⊙ ○ | ○ ⊙ | |
| ⓘ --Ocwen BPO | ⊙ ○ | ⊙ ○ | Set Up Profile |
| ⓘ --Ocwen Comparative Market Analysis(CMA) | ⊙ ○ | ⊙ ○ | Set Up Profile |
| ⓘ --Ocwen Value Range Verification(VRV) | ⊙ ○ | ○ ⊙ | |
| ⓘ --VA Comparative Market Analysis(CMA) | ○ ⊙ | ○ ⊙ | |
| APPRAISAL SERVICES | | | |
| ⓘ --1004 Investment property | ⊙ ○ | ⊙ ○ | Set Up Profile |
| ⓘ --1025 Investment property | ⊙ ○ | ⊙ ○ | |
| ⓘ --1073 Investment property | ⊙ ○ | ○ ⊙ | |
| ⓘ --2055 Interior Exterior Investment Property | ⊙ ○ | ⊙ ○ | Set Up Profile |
| ⓘ --216 OIS and 1007 RS Joint Statement | ⊙ ○ | ⊙ ○ | Set Up Profile |
| ⓘ --Appraisal Update | ⊙ ○ | ○ ⊙ | Set Up Profile |
| ⓘ --Desk Review | ⊙ ○ | ⊙ ○ | |
| ⓘ --Drive-by Appraisal | ⊙ ○ | ⊙ ○ | |

620 — Active column
630 — Auto Assign column
640 — Options column
645 — (callout)
610 — section headers
615 — product rows

Fig.7

Vendor Assurance — 700

| WORKSTATION | REPORTS | ADMIN | VENDOR ADMIN | HELPFUL INFO | LOGOFF |

REALTrans.com℠

Options
- Create New File
- Custom Search
- Bulk Management
- Portfolio Management Search Criteria
- ⊙ Exact  ○ Begins
- Enter File #  [     ] (Go)
- Enter Borrower Last Name  [     ] (Go)

(Refresh)   Select View ▼   (Re-Query)

Work Queue

FILES
- Today's Files    Last 90 Days    New
- Last 7 Days     New Msgs        Late
- Last 30 Days    New Docs        New Forms ORDERS
- Today's Orders   Last 90 Days    New
- Last 7 Days      Due Today       Late
- Last 30 Days     New Docs        New Forms For other periods, use Custom Search

Set Up Profile

| Criteria | Select |
|---|---|
| Eligibility Options — 710 | |
| Use Licensed Vendors | ○ Yes  ⊙ No |
| Licensed Expiration Buffer (Days) | [ 7 ] — 712 |
| Product Options — 720 | |
| Score Cards Calculation Period (Days) | [ 5 ] — 722 |
| Allow Override of Auto Assignment | ⊙ Yes  ○ No |
| Set Auto Reprocessing Indicator | ⊙ Yes  ○ No |
| * Effective Date | 8/19/2005 — 724 |

(Next) (Cancel) — 760

Fig. 8

Vendor Assurance — 800

REALTrans.com℠

WORKSTATION | REPORTS | ADMIN | VENDOR ADMIN | HELPFUL INFO | LOGOFF

Options
- Create New File
- Custom Search
- Bulk Management
- Portfolio Management

Search Criteria
- ⊙ Exact  ○ Begins
- Enter File # [          ] (Go)
- Enter Borrower Last Name [          ] (Go)

Work Queue (Refresh) | Select View ▼ (Re-Query)

FILES | ORDERS
Today's Files | Last 90 Days | Today's Orders | Last 90 Days | New
Last 7 Days | New Msgs | Last 7 Days | Due Today | Late
Last 30 Days | New Docs | Last 30 Days | New Docs | New Forms For other periods, use Custom Search

Create an Ordering Profile
(An Ordering Area needs to be associated with each product you order.)

Step 1. Setup Order Criteria

| Select | Criteria | Order |
|---|---|---|
|  | Ordering Area | 0 |
|  | FICO Score | 1 |
|  | Loan To Value | 2 |
|  | Loan Amount | 3 |
|  | Property Type | 4 |

(Reset Criteria) — 840

(Once you setup your Criteria Selection you cannot make modifications without losing your profiles.
To modify Criteria you must first reset the Criteria and then redefine your Order Profiles.)

Step 2. Setup Order Profiles

| Profile Name | Description | Default | Ordering Area Name | Profile Status | Action | | |
|---|---|---|---|---|---|---|---|
| default | default profile | Yes |  | ACTIVE | Modify |  |  |
| demo test | Demo test | No | Nationwide | ACTIVE | Modify | Deactivate | Delete |

(Create New Ordering Profile) — 860

*(Figure 9 shows a rotated screenshot of a "Vendor Assurance" / REALTrans.com interface with labeled elements 900, 101, 905, 910, 915, 920, 950, including navigation tabs WORKSTATION, REPORTS, ADMIN, VENDOR ADMIN, HELPFUL INFO, LOGOFF; Options menu with Create New File, Custom Search, Bulk Management, Portfolio Management; Search Criteria with Exact/Begins radio buttons, Enter File #, Enter Borrower Last Name; Work Queue with FILES and ORDERS sections; and an Order Profile form with Profile Information fields: Order Profile Name "demo test", Order Profile Description "Demo Test", Ordering Area "NationWide", and Next/Cancel buttons.)*

Fig. 10

Vendor Assurance — 1000

REALTrans.com℠

| WORKSTATION | REPORTS | ADMIN | VENDOR ADMIN | HELPFUL INFO | LOGOFF |

Options
- Create New File
- Custom Search
- Bulk Management
- Portfolio Management Search Criteria
- ⦿ Exact  ○ Begins
- Enter File #  [____] Go
- Enter Borrower Last Name  [____] Go Work Queue — Refresh — Select View ▼ — Re-Query FILES
- Today's Files | Last 90 Days | New
- Last 7 Days | New Msgs | Late
- Last 30 Days | New Docs | New Forms ORDERS
- Today's Orders | Last 90 Days
- Last 7 Days | Due Today
- Last 30 Days | New Docs For other periods, use Custom Search

Order Profile Definition

Profile Information — 1010

| Criteria | Value |
|---|---|
| Name | demo test |
| Description | Demo Test |
| Product | Complete |
| Ordering Area | Nationwide |

1030

| Criteria | Value | Options | |
|---|---|---|---|
| Ordering Area | NationWide | Add Parameter | |
| FICO Score | 700.00 - 790.00 | Add Parameter | |
| Loan To Value | 50.0000% - 80.0000% | Add Parameter | |
| Loan Amount | $350,080.00 - $450,000.00 | Edit | Delete |
| Property Type | Single Family | Edit | Delete |
| Distribution | 10000859 | Edit | Delete |
|  |  | Edit | Delete |

(Back) — 1050

Fig. 11

Vendor Assurance

REALTrans.com℠ — 1100

| WORKSTATION | REPORTS | ADMIN | VENDOR ADMIN | HELPFUL INFO | LOGOFF |

Options
Create New File
Custom Search
Bulk Management
Portfolio Management

Search Criteria
⊙ Exact  ○ Begins
Enter File #  [   ] (Go)
Enter Borrower Last Name  [   ] (Go)

Work Queue  (Refresh)  Select View ▼  (Re-Query)

FILES
Today's Files    Last 90 Days
Last 7 Days     New Msgs
Last 30 Days    New Docs ORDERS
Today's Orders   Last 90 Days   New
Last 7 Days      Due Today      Late
Last 30 Days     New Docs       New Forms For other periods, use Custom Search

— 101

*Profile Parameters And Distribution*

New Profile Parameters
Ordering Area    [NationWide]
FICO Score       [  ] to [  ]
Loan To Value    [  ] to [  ]
Loan Amount      [  ] to [  ]
Property Type    [  ]

— 1110

*Distribution Method*
(Choose a Distribution Method)

○ Equal Distribution
   (orders are distributed equally amongst available vendors)

☐ Check here to distribute orders to all approved vendors.
      Uncheck to specify vendors for order distribution.

○ Specified Distribution
   (orders are distributed to specific vendors utilizing a defined distribution)

○ Qualitative Distribution
   (orders are distributed equally based upon each vendor's qualitative performance)

Vendor Assurance — 1200

| WORKSTATION | REPORTS | ADMIN | VENDOR ADMIN | HELPFUL INFO | LOGOFF | | REALTrans.com℠ |

Options
- Create New File
- Custom Search
- Bulk Management
- Portfolio Management

Search Criteria
- ⊙ Exact  ○ Begins
- Enter File # [      ] (Go)
- Enter Borrower Last Name [      ] (Go)

(Refresh)   Select View ▼   (Re-Query)

Work Queue

FILES
- Today's Files
- Last 7 Days
- Last 30 Days
- Last 90 Days
- New Msgs
- New Docs ORDERS
- Today's Orders
- Last 7 Days
- Last 30 Days
- Last 90 Days
- Due Today
- New Docs
- New
- Late
- New Forms For other periods, use Custom Search

Distribution Parameters — 1210
(Establish Distribution Limits)
- ⊙ Yes ○ No  Subject to Vendor License Requirements
- ⊙ Yes ○ No  Subject to Vendor Capacity Limits
- ⊙ Yes ○ No  Subject to Vendor Threshold Limits
- ⊙ Yes ○ No  Subject to Daily Capacity Limits
- ⊙ Yes ○ No  Subject to Late Order Ratio Limits

— 1220

| Activate Vendors | Company | City | State | View Office Info |
|---|---|---|---|---|
| ☑ | First American-eAppraiseIT | Poway | CA | View |
| ☑ | First American Appraisal Services-David Feldman | Poway | CA | View |
| ☑ | Vickie Vendor Services-Rocky Hill Branch | Rocky Hill | CT | View |
| ☐ | Vendor Test Company 2 - Vendor Test Office 2 | NYC | NY | View |
| ☐ | VenMan Test1 - VenManTest1 | WPB | FL | View |
| ☐ | Vendor Company Test 1 - Vendor Office Test 1 | NYC | NY | View |
| ☑ | Vendor Test Company 03 - Vendor Test Office 03 | NYC | NY | View |

(Save) (Cancel)

METHODS AND SYSTEMS FOR VENDOR ASSURANCE

CROSS-REFERENCE TO RELATED APPLICATIONS

This application claims the benefit of U.S. Provisional Application No. 60/996,975 titled "METHODS AND SYSTEMS FOR VENDOR ASSURANCE" filed Dec. 13, 2007. This application is also a continuation-in-part of U.S. application Ser. No. 10/937,879 titled "METHOD AND SYSTEM FOR VENDOR MANAGEMENT" filed Sep. 10, 2004, which claims the benefit of U.S. Provisional Application No. 60/502,273 filed Sep. 12, 2003. Each of the above-mentioned patent applications is incorporated by reference herein.

BACKGROUND OF THE INVENTION

1. Field of the Invention

The present invention relates to a method and system for managing financial transactions that require goods and/or services from multiple vendors, and, in particular, to methods and systems for selecting vendors to carry out sub-transactions associated with a financial transaction.

2. Background of the Technology

There exist in related arts paper-based methods and systems for completing financial transactions, such as mortgages, but these systems are inefficient and are bound by the limitations of traditional paper-based systems. Computer-implemented systems to manage financial transactions are also known, but these systems do not possess functionality to manage each step in the lifespan of an entire financial transaction. Moreover, related art computer-implemented systems do not provide functionality to initiate or track sub-transactions that are necessary for the completion of a financial transaction. Further, related art computer-implemented systems do not provide functionality to a system user (also alternatively or interchangeably referred to as an employee, agent, affiliate of a financial institution, or user) for efficiently selecting third party vendors for carrying out sub-transactions associated with a financial transaction (also alternatively or interchangeably referred to herein as "vendors") for carrying out sub-transactions associated with a financial transaction.

There exist in related arts paper-based methods and systems for selecting vendors to execute sub-transactions to be performed in the execution of a financial transaction. However, these systems offer only a marginal increase in efficiency, due to the overhead requirements for executing these systems. There are known in related arts systems and methods for vendor selection, but these systems and methods generate excess transactional costs in the management of vendor selection. Known methods and systems do not easily allow a system user to use a precise methodology for selecting a particular vendor.

Computer-implemented systems for vendor selection are also known in related arts, but these systems do not contain the necessary functionality to select a vendor based on specific user criteria. These computer-implemented systems are not easy to customize, and often apply the same methodology for vendor selection without regard to the type of product being ordered, or the preferences of the system user who places the order.

SUMMARY OF THE INVENTION

The present invention relates to a method and system for electronically facilitating a business transaction between a financial institution and a system user, wherein the business transaction optionally includes one or more sub-transactions among a vendor and a customer, a vendor and a financial institution, or between a customer and a financial institution.

In an aspect of the present invention, the method and system may begin when a system user selects a sub-transaction to be executed. The system user may choose an ordering profile to be associated with that product. If no ordering profile meets the needs of that particular system user, then the system user may create an ordering profile. Once an ordering profile is selected, the system applies the ordering profile to a list of eligible vendors, based on the system user's preferences. The system or the system user then selects a vendor whose characteristics most closely match the system user's requested characteristics from the order profile.

The present invention utilizes three distribution models for selecting vendors. The first is an equal distribution model, wherein vendors may be selected based solely on a round-robin method, which selects all available vendors once before selecting a vendor for a second product order. The second model is a specific distribution model, which allows the system user to assign a specific amount of the orders to each vendor. The third model is a qualitative distribution model, where a vendor is selected based on user-defined performance criteria.

For the purposes of this application, "financial institutions" include banks, investment companies, real estate lenders, investment and holding companies, and/or other commercial entities engaged in the business of financing loans or mortgages. "System users" include anyone using the present invention to select a vendor for ordering a product, regardless of the role of each user in the transaction. "Product" in this context can be a good or service, generally needed to complete a financial transaction.

Additional advantages and novel features of the invention will be set forth in part in the description that follows, and in part will become more apparent to those skilled in the art upon examination of the following or upon learning by practice of the invention.

BRIEF DESCRIPTION OF THE FIGURES

In the drawings:

FIGS. 6-12 illustrate a sample Graphical User Interface ("GUI") screens presented to a system user in conjunction with an aspect of the present invention.

DETAILED DESCRIPTION

The present invention provides a system and method for executing financial transactions, such as a mortgage transaction. In one aspect of the present invention, executing a financial transaction may include ordering one or more sub-transactions (also referred to interchangeably herein as "products"). Sub-transactions include, for example, actions that may be required or desired to complete the financial transaction. Numerous third party vendors may compete for the right to complete these sub-transactions. Parties to the transaction (also referred to interchangeably herein as "system users") may prefer to use multiple vendors, thereby ensuring the vendor most capable of delivering the product receives the order.

In one aspect of the present invention, the system user may not manually select a vendor from which to order a product. Rather, the system user develops an ordering profile for each product ordered. The ordering profile may include vendor licensing information, the active area of the vendor, among other vendor characteristics. After the system user chooses an ordering profile, the ordering profile may be applied to a list of eligible vendors, and the vendor that most closely matches the ordering profile is selected. The new vendor selection method reduces customer costs, in part due to the reduction in manual processes by the system user, and also reduces erroneous product ordering (e.g., ordering the wrong set of products for a specified financial transaction).

Figure 1:
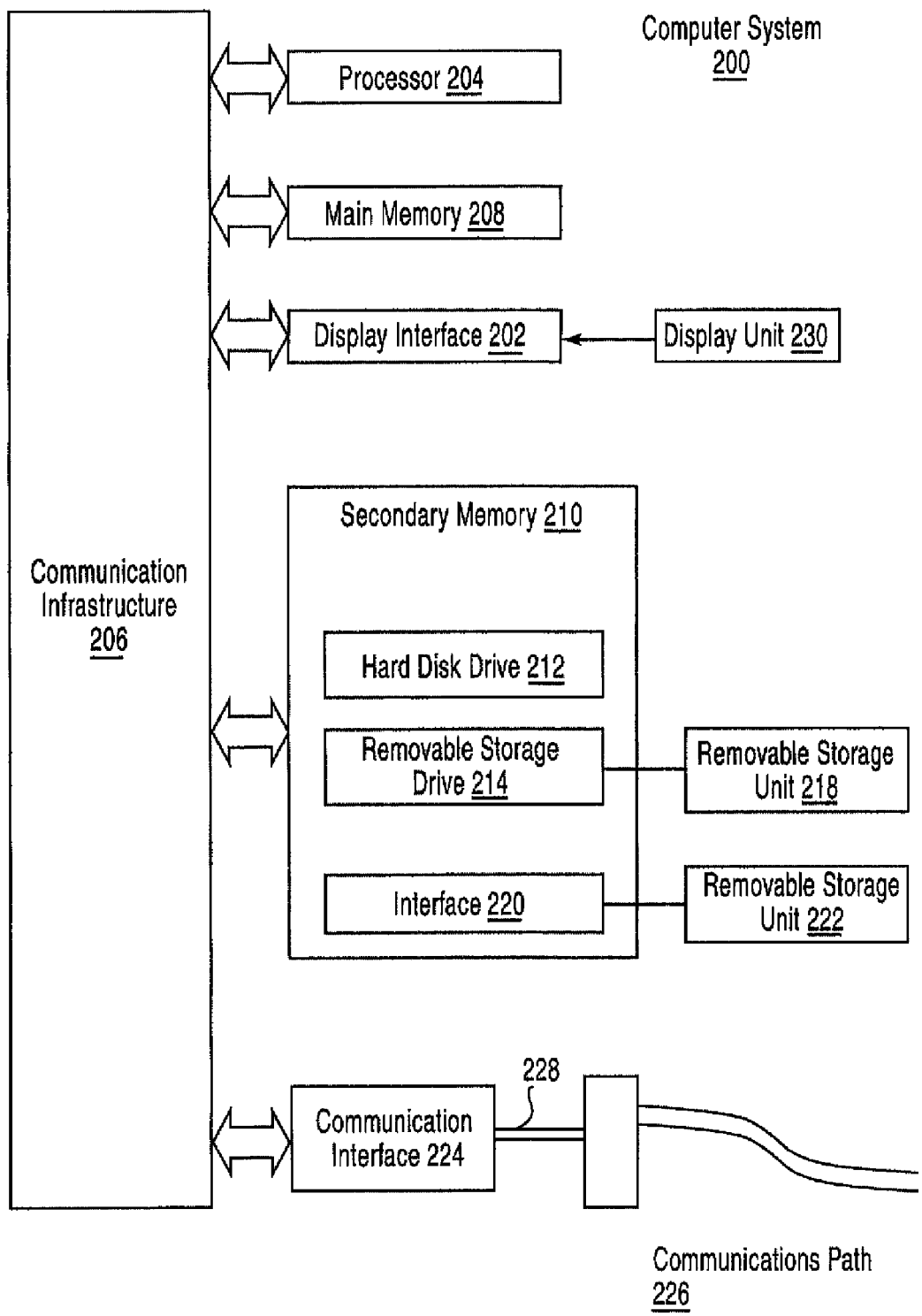
FIG. 1 illustrates various features of an example computer system for use in accordance with an aspect of the present invention.

The present invention may be implemented using hardware, software or a combination thereof and may be implemented in one or more computer systems or other processing systems. In one aspect, the invention is directed toward one or more computer systems capable of carrying out the functionality described herein. An example of such a computer system 200 is shown in FIG. 1.

Computer system 200 includes one or more processors, such as processor 204. The processor 204 is connected to a communication infrastructure 206 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on the display unit 230. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well known manner. Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In alternative aspects, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard disk drive 212, and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an aspect where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another aspect, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another aspect, the invention is implemented using a combination of both hardware and software.

Figure 2:
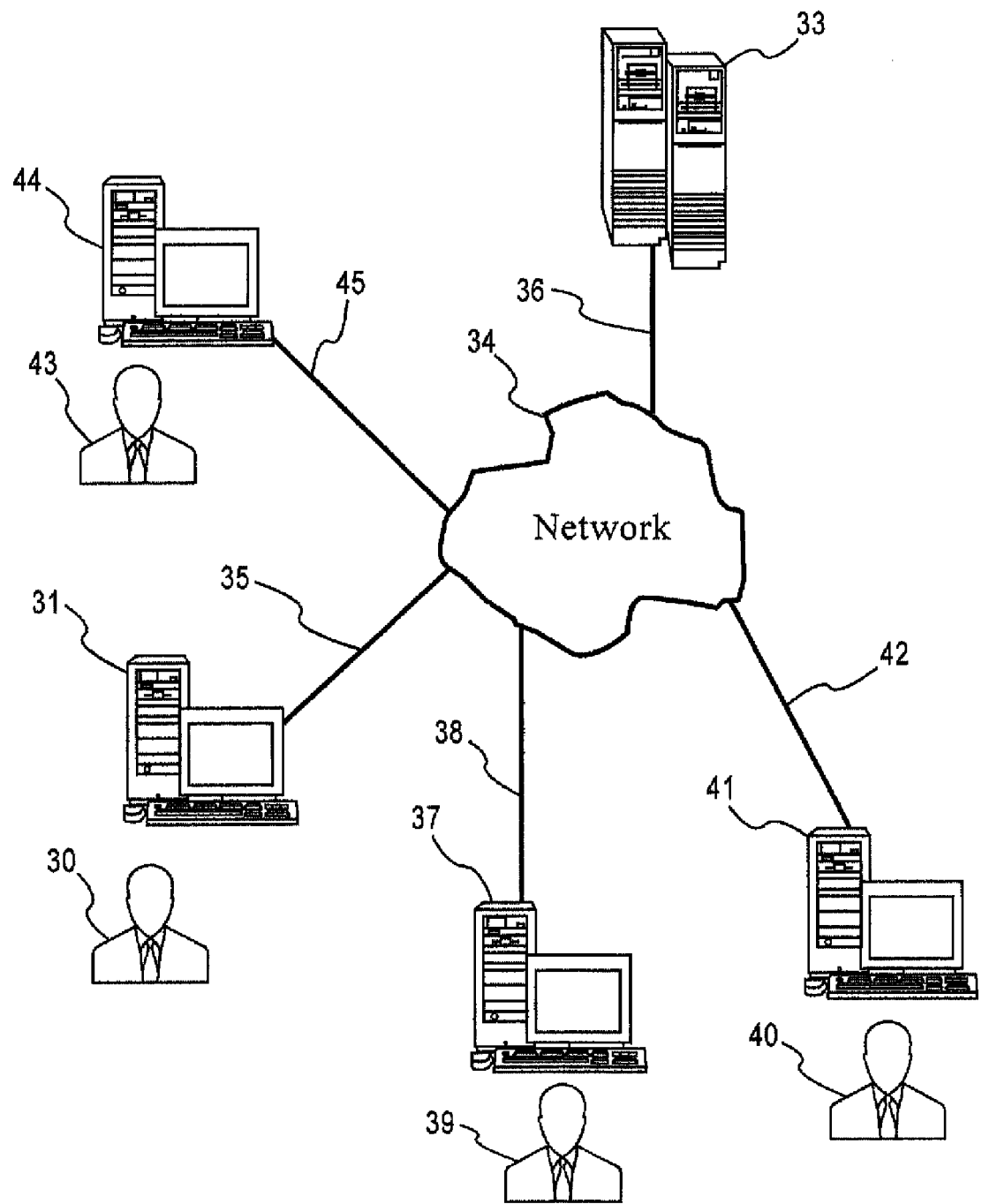
FIG. 2 illustrates an exemplary system diagram of various hardware components and other features, in accordance with an aspect of the present invention.

FIG. 2 presents an exemplary system diagram of various hardware components and other features in accordance with an aspect of the present invention. As shown in FIG. 2, in an aspect of the present invention, data and other information and services for use in the system are, for example, input by a user 30 via a terminal 31. The terminal 31 is coupled to a server 33 via a network 34, such as the Internet, via couplings 35, 36. In one aspect, a vendor 39 also inputs information/data via a terminal 37 coupled 38 to the network 34. Furthermore, in one aspect, a member of an outsourced workforce 40 inputs information/data via a terminal 41 coupled 42 to the network 34, and in another aspect, a member of a financial institution workforce 43 inputs information/data via a terminal 44 coupled 45 to the network 34.

Each of the terminals 31, 37, 41, 44 includes, for example, a personal computer (PC), minicomputer, mainframe computer, microcomputer, telephone device, personal digital assistant (PDA), or other device having a processor and input capability. The server 33 includes a PC, minicomputer, mainframe computer, microcomputer, or other device having a processor and a repository of data or access to a repository of data.

In operation, for example, in an aspect of the present invention, via the network 34, vendor data, transactional data, sub-transactional data, order data and/or other information is communicated with the server 33. The server 33 receives and resolves the transaction, including triggering and resolving sub-transactions, stores data regarding the transaction, vendor, and sub-transaction, and documents the transaction (e.g., electronically).

In one aspect, the present invention uses active server page (ASP) technology to deliver information and services to a user. This technology may include one or more ASPs stored on the server 33. This approach reduces maintenance and hardware expenses, results in limited implementation/integration costs, limited support expense, and low total cost of ownership.

In one aspect of the present invention, information relating to a transaction, such as a loan, is stored electronically. This information is referred to interchangeably herein as a virtual loan file. Among other things, the virtual loan file enables data mining, reduces post closing quality reviews, facilitates secondary market due diligence, streamlines loan servicing functions, reduces data archive costs, reduces processing costs, automates routine and decision based processes, and reduces data entry errors.

Figure 3:
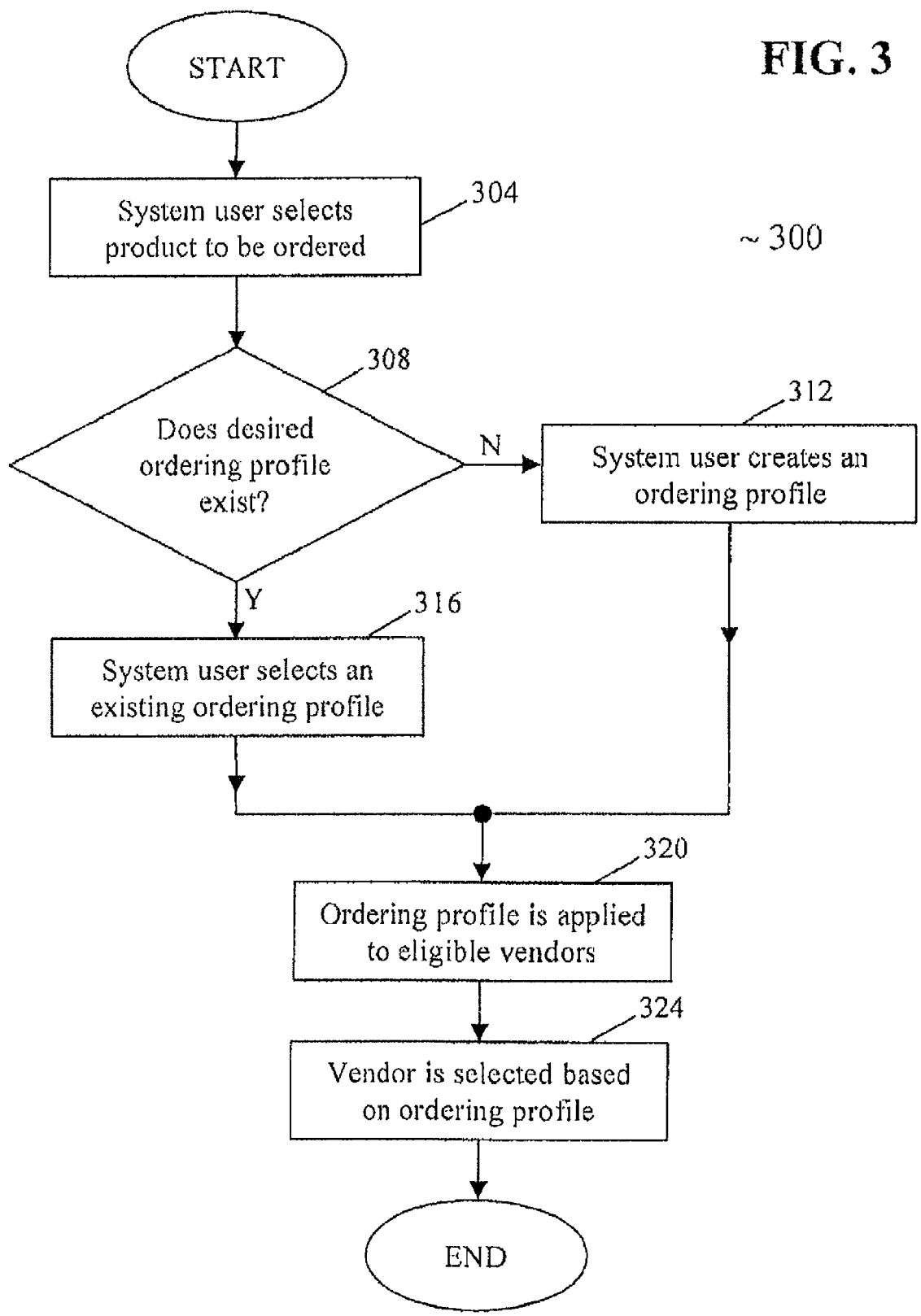
FIG. 3 illustrates a high-level example representative flow diagram of functions performed in accordance with an aspect of the present invention.

FIG. 3 illustrates a high-level exemplary flow diagram 300 according to an aspect of the present invention. The system user may select a product to be ordered 304. After product selection, a determination may occur as to whether the desired ordering profile exists 308. The desired ordering profile may include vendor licensing information, the active area of the vendor, among other vendor characteristics. If the desired profile exists, the desired ordering profile is selected 316. If the desired profile does not exist, the system user may be prompted to create an ordering profile 312. Once an ordering profile has been created and selected, then the ordering profile may be applied to eligible vendors 320. The vendors may be outputted on an output device, such as a printer, display or audio device, for example. The vendor that most closely aligns with the desired characteristics indicated in the ordering profile may be identified 324. The flow diagram of FIG. 3 will be described in more detail with reference to flow diagram FIGS. 4A-4B and 5A-5C, and GUI screen FIGS. 6-12.

Figure 4A:
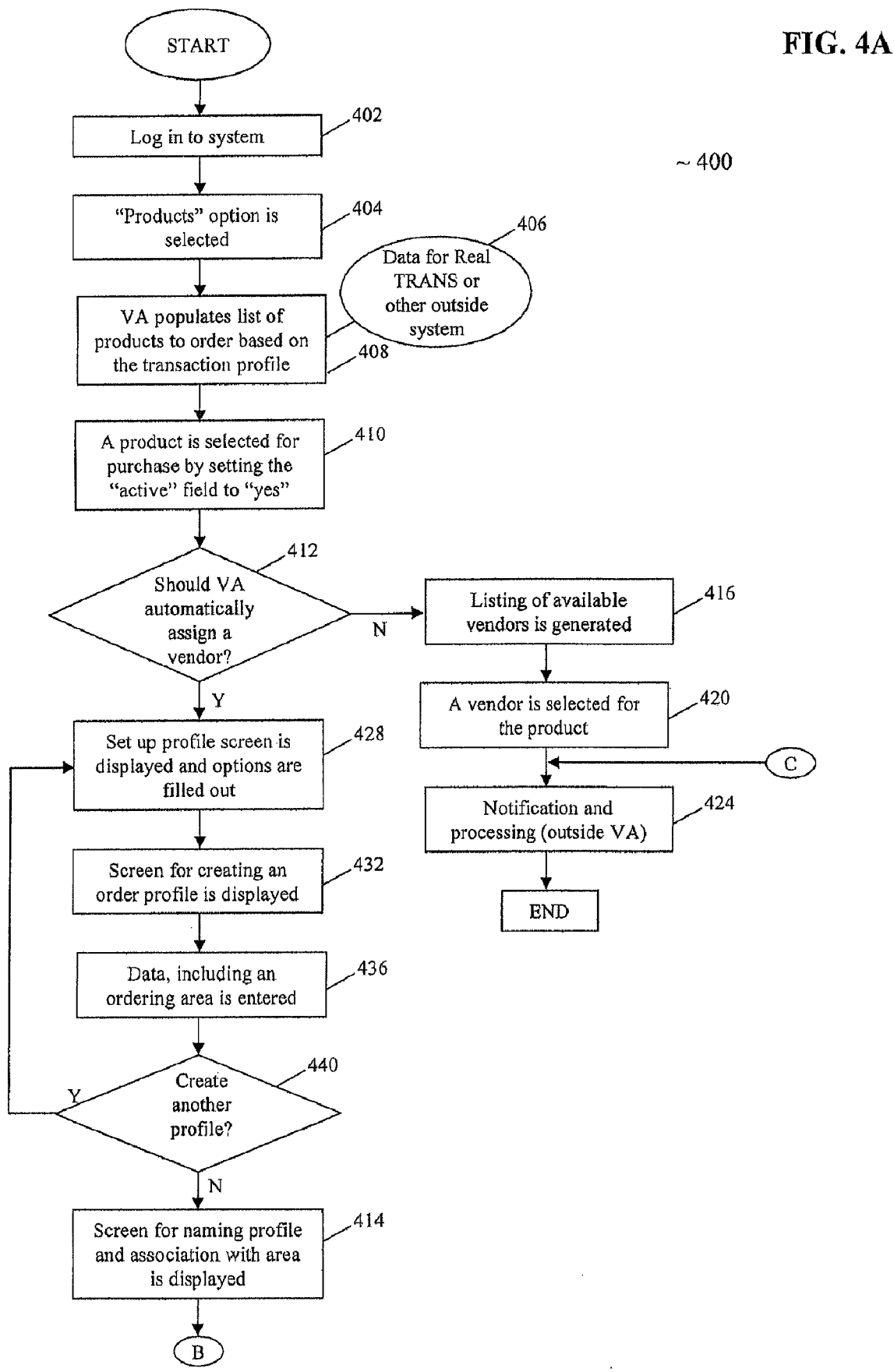
FIGS. 4A-4B illustrates a more detailed example representative flow diagram of functions performed in accordance with an aspect of the present invention.
Figure 4B:
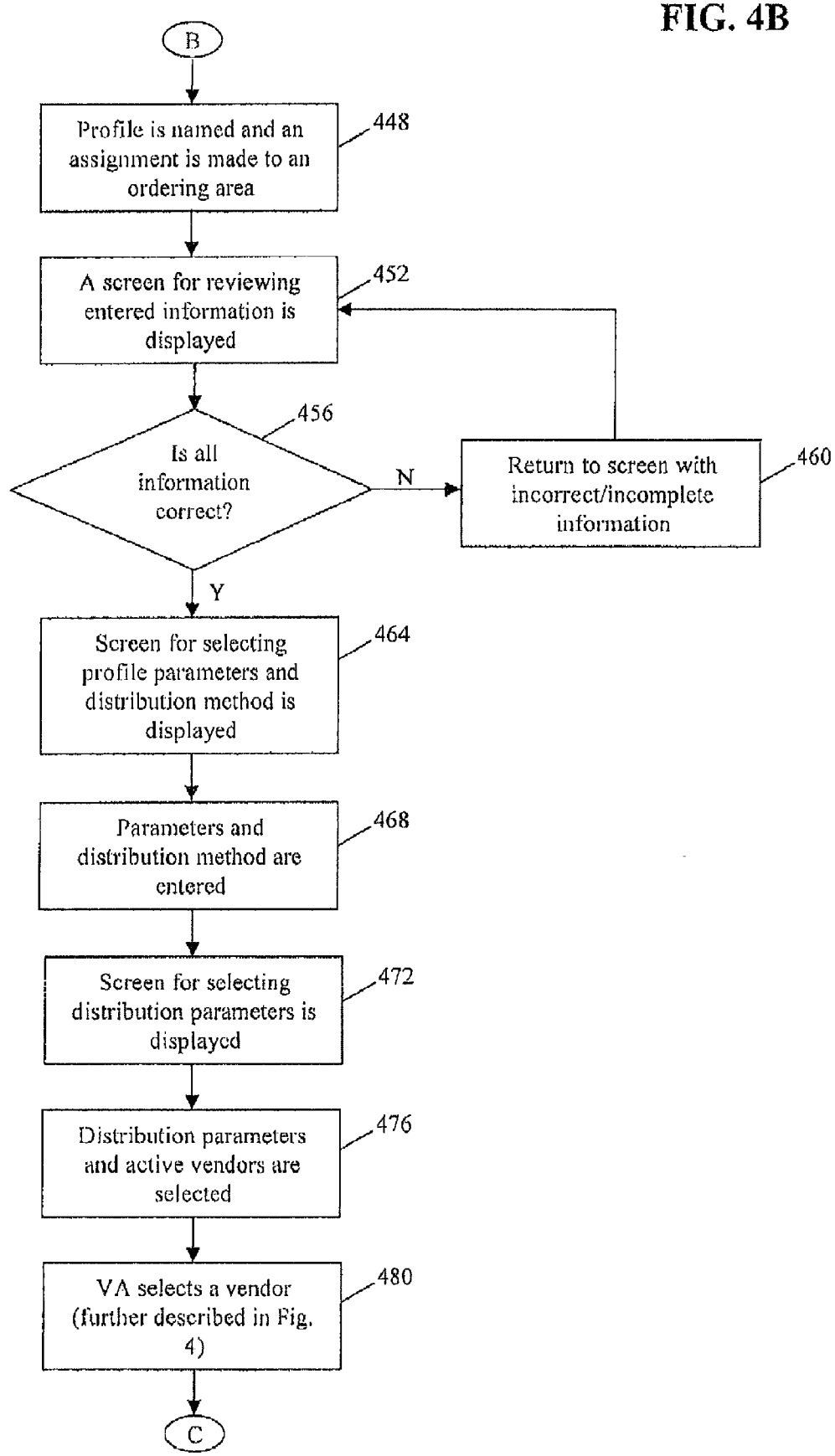

FIGS. 4A-4B show a flow chart 400 of a vendor assurance method for one aspect of the present invention. The method of FIGS. 4A-4B provides seamless integration with preliminary loan services. The process starts when a system user logs into the Vendor Assurance system 402. When the option corresponding to "products" is selected 404, the present invention may populate a list of products to order based on the transaction profile 408. Depending on the implementation of the system, this information may be provided from an outside system 406, such as the method and system of U.S. patent application Ser. No. 09/512,845 filed Feb. 25, 2000, titled "Method for Workflow Processing Through Computer Network," the entirety of which is hereby incorporated herein by reference. If no transaction profile is provided, then a list of products to order may be populated 408 by retrieving a predetermined default list of products to order.

After the list is populated, a product may be selected for purchase by setting the "active" field to "YES" 410. If the system user desires to manually select a vendor 412, then a listing of available vendors may be generated 416. From this list, the system user may select a vendor to deliver the product 420. An outside source for notification and processing of the order 424 may be contacted or order processing may be otherwise initiated.

If, instead, the system user wants the present invention to assign a vendor, then in the "Auto Assign" field, the system user selects "YES." This causes the option "Set Up Profile" to be displayed 428. Selection of this option may result in prompting for creation of an ordering profile 432. Various options for ordering may be then selected 436. For example, the system user may specify to use only licensed vendors, and specify a minimum number of days before that vendor's license expires, among other options for ordering. In an aspect of the present invention, the system user may select a period of days over which to assess the score cards used to evaluate vendors. In another aspect of the present invention, the system user may also decide to override the auto assignment feature. For example, the system user may select a vendor for ordering the product without using an order profile.

In one aspect, when creating an order profile 432, the system user specifies criteria for evaluating vendors. For example, criteria may include order area, Fair, Isaac and Company (FICO) credit score, loan-to-value ratio, loan amount, and property type, among other criteria. The system user may also provide each criterion with an "order" value, which ranks in descending order of importance, for example, how heavily each criterion should be weighted. In one aspect of the present invention, the ordering area may be set as the default value for the most heavily-weighted criterion. Ordering areas may include, for example, cities, states, or anywhere in the country, among other order areas.

After the system user enters an order profile 436, the system user has the option of creating another profile 440. If the system user wishes to create another profile, the current profile may be saved for use by the system user. If the system user does not wish to create another profile, a screen for naming the profile and associating the profile with an ordering area may be displayed 444. The system user may name the profile, in order that the profile may be more easily retrieved. In addition, naming the profile may allow the system user to set an active ordering area for the profile 448. Optionally, the system user can enter an order profile description to provide information about the ordering profile in a convenient location.

A prompt may be provided for reviewing the entered information 452 allowing the system user to view the order profile information. If any of the criteria the user previously inputted may be incorrect 456, then the user may make changes by selecting the "edit" box associated with the incorrect criteria, or, for example, use the "back" button to return to the screen where the incorrect information was entered 460.

Then, a GUI screen appears, or other prompt may be provided, for selecting new profile parameters and a distribution method 464. Here, vendor limit parameters may be selected, and a distribution method may be associated with profile 468. The distribution method options available to the system user may include, for example, equal distribution, specified distribution, and qualitative distribution, among other distributions.

In an equal distribution system, vendors may be selected in a round-robin fashion. Once a vendor has been selected to furnish a product, the selected vendor may not be selected to furnish another product until all other vendors have had the opportunity to be selected. In a specified distribution system, orders may be distributed to specific vendors utilizing a defined distribution specified by a system user. For example, a system user may wish to utilize Vendor A 30% of the time, Vendor B 10% of the time, and Vendor C 60% of the time. Thus, in a specified distribution system, a vendor may be selected with a frequency based on these percentages. In a qualitative distribution system, orders may be distributed based on a vendor's qualitative performance. In a process that will be described more fully below, system users have the option of assigning each vendor a grade, based on quality and timeliness, among other considerations, in proportions selected by the system user. When this method is selected, the present invention may choose the most qualified vendor available based on the scoring criteria specified by the system user. If the most qualified vendor is not available, the present invention may select the second most qualified vendor, and so on, until the order is fulfilled.

A new GUI screen appears, or another prompt may be made, for allowing a system user to view and/or specify distribution parameters 472 and select vendors 476. Some examples of limits for distribution parameters may include vendor license requirements, vendor capacity limits, vendor threshold limits, daily capacity limits, and late order ratio limits, among other limits. The screen may also includes a list of currently active vendors, so that if a system user wishes to temporarily remove a vendor from the list, the system user can uncheck the box next to that vendor's name, for example, and that vendor may not be considered when a vendor is selected.

Once the above-mentioned steps are completed, a vendor may be selected 480 (the process of which is further illustrated in FIG. 5 and the associated description). Once the vendor is selected, the present invention may interface with an outside system to notify and process the order with the vendor selected 424.

Figure 5A:
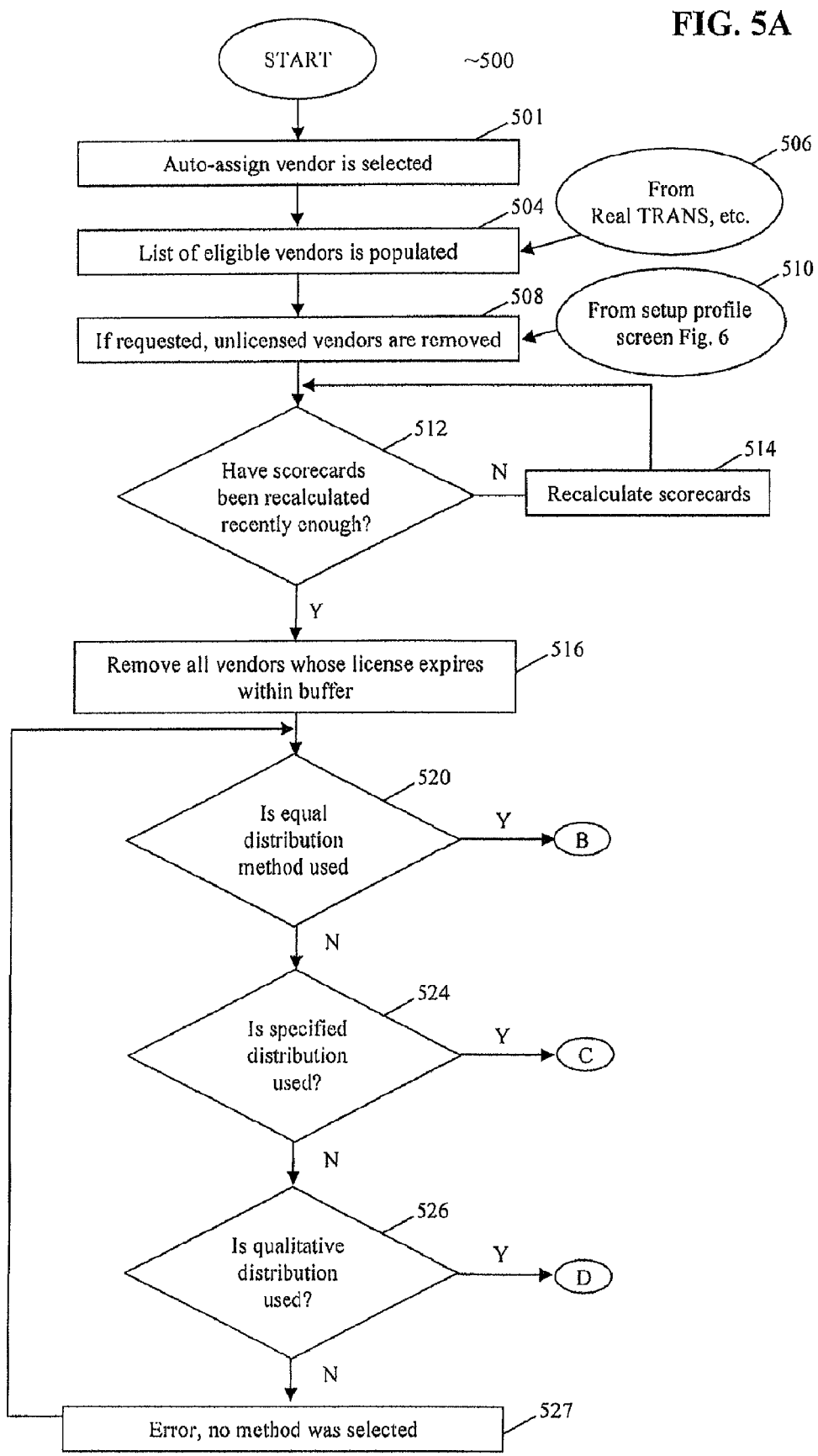
FIGS. 5A-5C illustrate an example representative flow diagram of vendor selection performed in accordance with an aspect of the present invention.
Figure 5B:
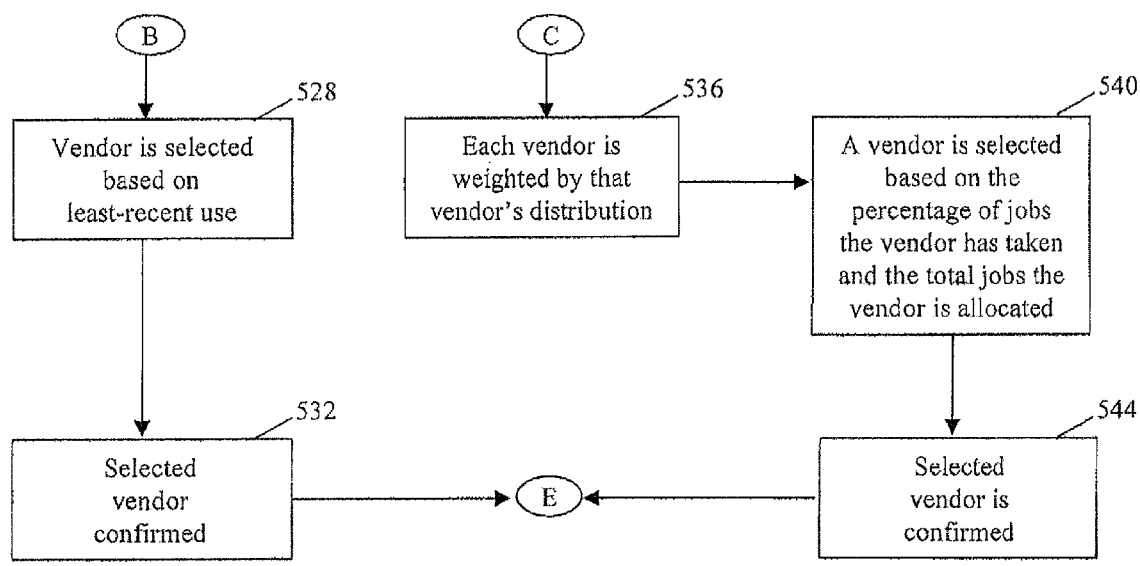
Figure 5C:
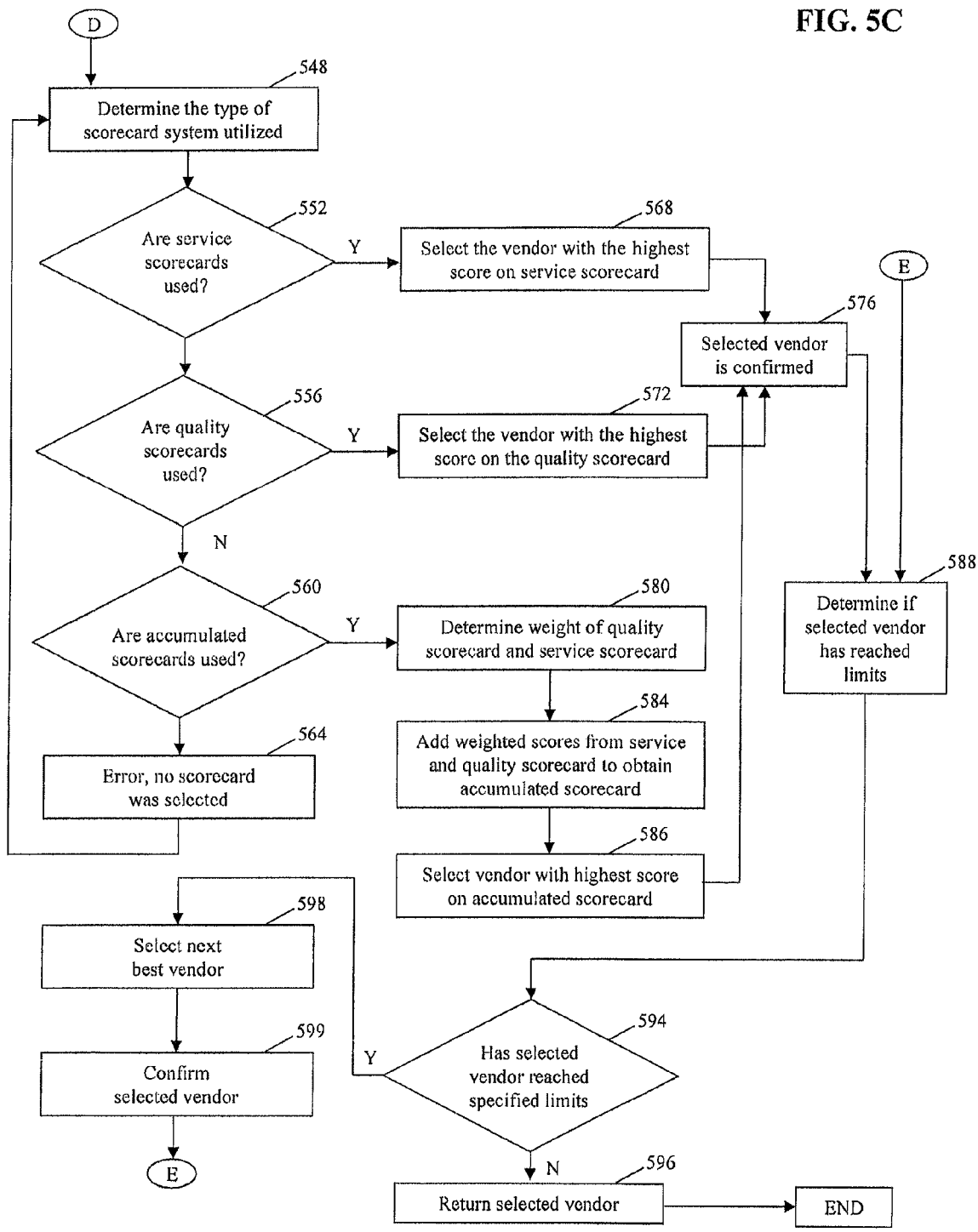

FIGS. 5A-5C show an exemplary flow diagram 500 illustrating the selection of a vendor according to an aspect of the present invention. At step 501, the "Auto Assign" field is set to "YES," or automatic assign of a vendor is otherwise enabled, and a list of eligible vendors may be populated 504. The list of eligible vendors may be drawn from various sources, such as, from an outside source 506, (e.g., the system described in U.S. patent application Ser. No. 09/512,845 referenced above), or from a list of vendors from which the system user has previously ordered products, among other sources. If the system user has requested that unlicensed vendors be removed, then the unlicensed vendors may be removed 508 from the list of vendors. This selection may also be made manually by the system user 510. Checks may be performed whether the scorecards for vendors, which may be used in determining licensing, have been recalculated recently enough 512, based on the number of days the system user specifies for the scorecard calculation period, for example. If the scorecards have not been recalculated as recently as the system user has specified for them to be calculated, then the present invention recalculates the scorecards 514.

The present invention may remove all of the vendors whose licenses expire within a predefined period (also interchangeably referred to herein as a "buffer") 516, calculated using a user-defined number of days, among other predefined periods. For example, if the user defined buffer is 7 days, and the date of vendor selection is Apr. 11, all vendors whose licenses expire before Apr. 18 may be removed from the list of vendors.

The system may determine which of the distribution systems (e.g., the three systems outlined above) to utilized for selecting the vendor. If the equal distribution method is used 520, for example, then a vendor is selected based on the least recent use 528 and once the vendor is confirmed 532. If the specified distribution method 524 is used, for example, then the present invention weights each vendor, based on that vendor's specified distribution 536. After the weighing of each vendor, the present invention may select a vendor based on the percentage of jobs the vendor has taken, and the total percent of the jobs the vendor is allocated under the specific distribution 540. The selected vendor is then confirmed 544. If a qualitative distribution method 527 is used, for example, then the present invention determines the type of scorecard system utilized 548.

In an aspect of the present invention, vendors may be ranked using one of three types of "scorecards." Each scorecard in this aspect works by assigning a vendor a point total, on a scale from 0 to 100, for example. A higher score may indicate a higher ranked, and thus more preferred, vendor. When the system user selects a profile which has been configured to utilize a qualitative distribution method, vendors may be prioritized by their scorecard score. The system user may select which scorecard to use when prioritizing the vendors. The system user may also select the frequency with which the scorecards may be updated and recorded. The scorecards may be collected by hand and manually entered into the system, or they may be updated based on the time of service completion and user satisfaction, among other entry methods.

The first type of scorecard utilized by the system in this aspect is a service scorecard. For each product, the service scorecard retrieves a user-customizable turnaround time. Each time a vendor delivers the product or completes the service within the optimal turnaround time, the system may award that vendor the maximum point value, 100 points, for example. For each day that the vendor is late, the system may deduct a predetermined number of points from the overall score.

The second type of scorecard utilized in this aspect is a quality scorecard. The quality scorecard may be based on multiple user-customizable factors. The system user may select the criteria used for assigning a score to the vendor's work, and may also customize the point value of each individual criterion, among other factors. For example, if the product to be ordered is an appraisal, the system user may set up appraisal-specific criteria. Such criteria may include, for example, the distance from the vendor to the subject property, whether the vendor signed the appraisal, whether the cost of the appraisal was within a given range, and whether the appraised value was within the projections of the computed data, among other criteria.

The third type of scorecard utilized by the system in this aspect is an accumulated scorecard. The accumulated scorecard may be a weighted average of the service scorecard and the quality scorecard. The user may define the weight to apply to each scorecard. For example, the system user may wish to assign a 60% weight to the service scorecard and a 40% weight to the quality scorecard. The accumulated scorecard value is the resulting weighted value of the service and quality scorecards.

In the exemplary aspect shown in FIGS. 5A-5C, if service scorecards are used 552, the present invention may select the vendor with the highest service scorecard score 568, and the selected vendor is confirmed 576. If quality scorecards are used 556, the vendor with the highest quality scorecard may be selected 572, and the selected vendor is again confirmed 576. If accumulated scorecards are used 560, a determination may occur to determine the weight of the quality scorecard and the service scorecard 580. The weighted scores from the service scorecard and the quality scorecard may be added together to obtain an accumulated scorecard 584. The vendor with the highest score on the accumulated scorecard may be selected 586, and the selected vendor is confirmed 576.

Once a vendor has been selected and confirmed, the system determines if the selected vendor has reached any of the user-defined limits 588. These limits may include, but are not limited to, vendor capacity limits, vendor threshold limits, daily capacity limits, and late order ratio limits, among other limits. If the selected vendor has reached any of the specified limits 594, then the next best vendor may be selected 598 and confirmed 599. If the selected vendor has not reached any specified limits 594, then the system returns the name of the selected vendor 596.

The method described in conjunction with the flow diagrams of FIGS. 3, 4, and 5, will now be described in more detail with reference to FIGS. 6-12 and the associated descriptions thereof.

FIGS. 6-12 illustrate various exemplary GUI screen shots according to an aspect of the present invention. FIG. 6 shows a screen shot including a first portion 101 detailing global options and menus, which, in one aspect of the present invention, is common to all GUI screens which may include standard system functions displayed to a system user. FIG. 6 also displays a table 610, which lists types of products to order, along with the specific product names 615. The list of products displayed can be based on the system defaults or the system user's preferences for the financial transaction, for example. Corresponding to each product entry may be three columns, "Active" 620, "Auto Assign" 630, and "Options" 640. In order to select a product, the system user may set "Active" to "YES" and "Auto Assign" to "YES." This allows the "Set Up Profile" flag 645 to appear in the "Options" column 640, indicating that this feature may be incorporated into the evaluation process.

Once a system user selects to proceed, the "Set Up Profile" screen 700 appears, as shown in FIG. 7. The Set Up Profile screen 700 includes two tables, an Eligibility Options table 710 and a Product Options table 720. In the Eligibility Options table, the system user selects the "Yes" or "No" button depending on whether the system user wants to use only licensed vendors. In the field labeled "License Expiration Buffer (Days)" 712, the system user may input the number of days of buffer required for a vendor before a license expires, as described in more detail above. In the Product Options table 720, the system user may input the Score Cards Calculation Period 722 in days. This number represents the time period over which each vendor's scorecard may be calculated. For example, if "5" is entered into the Score Cards Calculation Period field 722, then each vendor's scorecard may be calculated based on the previous five days. The system user may also set options to allow the overriding of an auto assignment, and whether to set the auto reprocessing indicator. The system user may also select an effective date, that is, the date from which the License Expiration Buffer 712 and the Score Card Calculation Period 722 may be calculated. This date is entered into the Effective Date field 724. When the system user has finished inputting information into this screen 700, the system user selects the "Next" button 760. Otherwise, the system user may cancel this input.

Once the system user selects the "Next" button 760 shown in FIG. 7, the system user is taken to the "Create an Ordering Profile" screen 800 shown in FIG. 8. FIG. 8 includes a screen portion 810 for setting up the order criteria. On this screen portion 810, the user's selected criteria may be displayed based on the system user's preferences. The criteria may be modified by selecting the "Reset Criteria" flag 840, and re-creating the order profiles in accordance with the description of FIGS. 6 and 7. FIG. 8 also includes a third portion 850 showing the order profiles that have been created. The order profiles may be modified by changing the "Modify" action flag 855, deactivated by changing the "Deactivate" action flag 857, or deleted by changing the "Delete" action flag 859. If the system user wishes to create a new ordering profile, then the Create New Ordering Profile button 860 is selected. For example, if the user wishes to modify the "Demo Test" profile 875 shown in FIG. 8, the system user changes the "Modify" action flag 855 in the row corresponding to the "Demo Test" profile 875. A screen for editing the profile information is then displayed.

FIG. 9 shows a screen shot of the "Order Profile" editing screen 900 according to one aspect of the present invention. FIG. 9 includes a screen portion 905 detailing the Profile Information for a specific order profile. If the system user reaches this screen by modifying an existing profile, for example, the profile information currently associated with that profile is loaded into the input fields, as shown in FIG. 9. If the system user reaches this screen by creating a new profile, then the fields shown in FIG. 9 may be initially blank.

Within the screen portion 905 of the GUI screenshot of FIG. 9, the system user may modify the Order Profile Name 910, and the Ordering Area 920. In one aspect of the present invention, the Ordering Area value 920 defaults to "Nation-Wide," indicating that the Order Profile may be used regardless of the location within a country in which the transaction takes place. A value for Ordering Area 920 is used by the system as a way of classifying the profiles. Optionally, the system user may type a description for the profile in the "Order Profile Description" field 915. This description may be used for convenience or reference and does not affect the functionality of the present invention. When the system user has inputted the required information, the system user then selects the "Next" button 950 to move on to the Order Profile Definition screen 1000 shown in FIG. 10.

FIG. 10 shows a screen shot 1000 of the "Order Profile" editing screen in one aspect of the present invention. FIG. 10 includes a screen portion 1010 displaying profile information, and another screen portion 1030 that allows modification of the criteria for the specified order profile. Screen portion 1010 may include a listing of the profile name, the profile description, the product associated with the profile, and the Ordering Area associated with the profile, among other profile information. Screen portion 1030 may illustrate the criteria used to evaluate vendors in order of priority. In one aspect of the present invention, the "Ordering Area" field of screen portion 1030 may be listed first in a different color without the "Edit" or "Delete" options because the Ordering Area field is required by the system so as to select vendors only in the appropriate area.

In another aspect of the present invention, the other criteria displayed in screen portion 1030 may be modified and/or deleted depending on the system user's preferences. The system user may add or modify parameters by changing the "Add Parameter," "Edit" or "Delete" flags corresponding to each criterion, for example. When the system user is satisfied with the criteria and the parameters, the user selects the "Back" button 1050 to continue the selection process.

If the system user selects "Create New Ordering Profile" 860 from the screen shot of FIG. 8, then after the system user completes the "Order Profile," such as in the screen 900 shown in FIG. 9, the system displays a "Profile Parameters and Distribution" screen 1100, as shown in FIG. 11. FIG. 11 shows the top part of an exemplary screen 1100, which may include a screen portion 1110 for new profile parameters, and another screen portion 1120 for distribution methods selection. When creating a new profile, the system user inputs parameters for the predefined criteria screen portion 1110, such as FICO Score, Loan To Value, Loan Amount, and Property Type, among other predefined criteria. It is noted that the user cannot change the Ordering Area on this screen in this aspect, because the Ordering Area is defined when naming the Order Profile, on the screen shown in FIG. 9.

After the system user inputs the profile parameters, the system user may select one of the distribution methods displayed in screen portion 1120. Here, the system user may select among Equal Distribution, Specified Distribution, and Qualitative Distribution, as further discussed above. In addition, the system user may select distribution parameters, and active vendors, as shown in the bottom part of an exemplary screen 1200, displayed here as FIG. 12. FIG. 12 is a screenshot showing the continuation of the screen shown in FIG. 11. FIG. 12 may include a screen portion 1210 listing distribution parameters, and a screen portion 1220 listing active vendors. In screen portion 1210, the system user may select limits to which vendors may be subjected, such as capacity limits, threshold limits, and daily capacity limits, among other limits. In doing so, a system user may restrict the number of orders that may be assigned to each vendor based on such factors.

In screen portion 1220, the system retrieves a list of vendors eligible to deliver products ordered with this profile. The system user may manually remove or add vendors to be considered eligible when using this profile. In an aspect of the present invention, the default option includes all vendors as activated, unless the system user deactivates them. When the system user has finished entering information, the system user selects the "Save" option 1250, and the Order Profile is saved within the system.

The set up order profile detailed in FIGS. 6-12 may be a used in the selection of a vendor or vendors to perform an order.

While the present invention has been described in connection with preferred aspects, it will be understood by those skilled in the art that variations and modifications of the preferred aspects described above may be made without departing from the scope of the invention. Other aspects will be apparent to those skilled in the art from a consideration of the specification or from a practice of the invention disclosed herein. It is intended that the specification and the described examples are considered exemplary only, with the true scope of the invention indicated by the following claims.

The invention claimed is:

1. A method for managing a financial transaction, the method comprising:
   receiving, via a computer, a selection of a product related to performing the financial transaction;
   receiving, via the computer, a selection of an ordering profile related to the product from one or more ordering profiles stored in the computer, said ordering profile having a plurality of characteristics;
   applying, via the computer, the ordering profile to a predetermined list of product vendors by comparing the plurality of characteristics in the selected ordering profile to characteristics associated with each vendor stored in the computer;
   obtaining, via the computer, a selection of a product vendor from the predetermined list to supply the product, the selected product vendor having characteristics aligned with the plurality of characteristics of the selected ordering profile; and
   outputting the selection of the product vendor on an output device.

2. The method of claim 1, further comprising:
   ordering the selected product from the selected product vendor.

3. The method of claim 1, wherein the ordering profile is one selected from a group consisting of an existing ordering profile and a new ordering profile.

4. The method of claim 3, wherein the ordering profile is a new ordering profile, the method further comprising:
   receiving a selection of an ordering area;
   receiving a selection of parameters for preselected criteria for evaluating vendors;
   receiving a selection of a distribution method; and
   receiving a selection of distribution parameters.

5. The method of claim 4, wherein the distribution method is one selected from a group consisting of an equal distribution method, a specified distribution method, and a qualitative distribution method.

6. The method of claim 1, wherein obtaining a selection of a product vendor includes:
   ranking the product vendors in the predetermined list based on criteria specified by an end user; and
   obtaining a selection of a ranked vendor having characteristics that most closely align with the plurality of characteristics of the ordering profile, based on a ranking of the plurality of characteristics.

7. The method of claim 6, wherein, if the selected ranked vendor has reached a predetermined number of orders designated as a limit, obtaining a selection of another ranked vendor.

8. A system for managing a financial transaction between a product vendor and a system user, the system comprising:
   at least one processor;
   a user interface operatively coupled to the at least one processor; and
   a repository accessible via the at least one processor;
   wherein said at least one processor is configured to:
   receive a selection of at least one product stored in the repository that is related to the completion of the financial transaction,
   receive a selection of a vendor ordering profile related to the product wherein the selected vendor ordering profile has a plurality of characteristics;
   compare the selected ordering profile plurality of characteristics to characteristics associated with each vendor stored in the repository;
   either
   display a list of vendors that result from the comparison of the vendor ordering profile plurality of characteristics to the characteristics associated with each vendor so that the user can select a vendor, or
   automatically select a vendor to supply the product based on the results of the comparison of the vendor ordering profile plurality of characteristics to the characteristics associated with each vendor.

9. The system of claim 8, wherein the ordering profile is one one of an existing ordering profile stored in the repository and a new ordering profile entered by the user.

10. The system of claim 9, wherein the ordering profile is a new ordering profile, the at least one processor further configured to:
    receive a selection of an ordering area;
    receive a selection of parameters for preselected criteria for evaluating vendors;
    receive a selection of a distribution method; and
    receive a selection of distribution parameters.

11. The system of claim 10, wherein the distribution method is one of an equal distribution method, a specified distribution method and a qualitative distribution method.

12. The system of claim 8, wherein the at least one processor is further configured to:
rank the product vendors in the predetermined list based on criteria specified by an end user; and
obtain a selection of a ranked vendor having characteristics that most closely align with the plurality of characteristics of the ordering profile, based on a ranking of the plurality of characteristics.

13. The system of claim 12, wherein, if the selected ranked vendor has reached a predetermined number of orders designated as a limit, the at least one processor is configured to obtain a selection of another ranked vendor.

14. A method for managing a financial transaction, the method comprising:
receiving, via at least one processor, a selection of a product related to performing the financial transaction;
selecting, via the at least one processor, an ordering profile relating to the product having a plurality of characteristics;
applying, via the at least one processor, the ordering profile to a plurality of vendors by comparing the selected ordering profile plurality of characteristics to characteristics associated with each vendor of the plurality of vendors that are stored in memory operatively coupled to the at least one processor;
ranking, via the at least one processor, the plurality of vendors based on the results of the comparison of the selected ordering profile plurality of characteristics to characteristics associated with each vendor;
selecting, via the at least one processor, one vendor from the plurality of vendors to supply the product having characteristics that most closely align with the plurality of characteristics of the ordering profile based on a ranking of the plurality of characteristics.

15. The method of claim 14, further comprising ordering the selected product from the selected vendor.

16. The method of claim 14, wherein the ordering profile is one of an existing ordering profile and a new ordering profile.

17. The method of claim 16, wherein the ordering profile is a new ordering profile, the method further comprising:
selecting, via that at least one processor, an ordering location;
receiving, via the at least one processor, a selection of parameters for preselected criteria for evaluating vendors;
receiving, via the at least one processor, a selection of a distribution method; and
receiving, via the at least one processor, a selection of distribution parameters.

18. The method of claim 17, wherein the distribution method is one of an equal distribution method, a specified distribution method, and a qualitative distribution method.

* * * * *